(12) United States Patent
Niwa

(10) Patent No.: US 11,153,519 B2
(45) Date of Patent: Oct. 19, 2021

(54) SOLID-STATE IMAGING ELEMENT, IMAGING DEVICE, AND CONTROL METHOD FOR SOLID-STATE IMAGING ELEMENT

(71) Applicant: Sony Semiconductor Solutions Corporation, Kanagawa (JP)

(72) Inventor: Atsumi Niwa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/041,955

(22) PCT Filed: Feb. 7, 2019

(86) PCT No.: PCT/JP2019/004390
§ 371 (c)(1),
(2) Date: Sep. 25, 2020

(87) PCT Pub. No.: WO2019/187685
PCT Pub. Date: Oct. 3, 2019

(65) Prior Publication Data
US 2021/0144320 A1    May 13, 2021

(30) Foreign Application Priority Data
Mar. 28, 2018 (JP) .............................. JP2018-062830

(51) Int. Cl.
*H04N 5/367* (2011.01)
*H04N 5/3745* (2011.01)

(52) U.S. Cl.
CPC ........... *H04N 5/367* (2013.01); *H04N 5/3745* (2013.01)

(58) Field of Classification Search
CPC .. H04N 5/367; H04N 5/3745; H04N 5/23218; H04N 5/23229; H04N 5/23251; H04N 5/23299
(Continued)

(56) References Cited

U.S. PATENT DOCUMENTS

| 7,173,741 B1 | 2/2007 | Kindt et al. |
| 8,395,127 B1 | 3/2013 | Frach et al. |

(Continued)

FOREIGN PATENT DOCUMENTS

| JP | 2010-087668 A | 4/2010 |
| JP | 2012-523025 A | 9/2012 |
| WO | 2017/086181 A1 | 5/2017 |

OTHER PUBLICATIONS

International Search Report dated Apr. 23, 2019 for corresponding International Application No. PCT/JP2019/004390.
(Continued)

*Primary Examiner* — Yogesh K Aggarwal
(74) *Attorney, Agent, or Firm* — Michael Best & Friedrich LLP

(57) ABSTRACT

A defective pixel is easily identified in a solid-state imaging element that detects an address event.
An address event detecting unit detects, as an address event, a fact that an absolute value of a change amount of luminance exceeds a predetermined threshold value with regard to each of a plurality of pixels, and outputs a detection signal indicating a result of the detection. A detection frequency acquisition unit acquires a detection frequency of the address event with regard to each of the plurality of pixels. A defective pixel identification unit identifies, on the basis of a statistic of the detection frequency, a defective pixel where an abnormality has occurred among the plurality of pixels.

15 Claims, 15 Drawing Sheets

(58) Field of Classification Search
USPC .................................................. 348/241–247
See application file for complete search history.

(56) References Cited

U.S. PATENT DOCUMENTS

| | | | |
|---|---|---|---|
| 2007/0189606 A1* | 8/2007 | Ciuc | G06T 7/90 382/195 |
| 2011/0069176 A1* | 3/2011 | Lin | H04N 17/002 348/175 |
| 2013/0322596 A1* | 12/2013 | Inoue | G01T 1/17 378/62 |
| 2017/0033777 A1 | 2/2017 | Kim et al. | |

OTHER PUBLICATIONS

Lichtsteiner, Patrick et al., "A 128X128 120dB 15us Latency Asynchronous Temporal Contrast Vision Sensor": IEEE Journal of Solid-State Circuits, Jan. 31, 2008, vol. 43, No. 2, pp. 566-576.
Extended European Search Report dated Mar. 16, 2021 for corresponding European Application No. 19776305.5.
Williams, George M. et al. "Pixelated Detector With Photon Address Event Driven Time Stamping and Correlation", 2013 IEEE Nuclear Science Symposium and Medical Imaging Conference (2013 NSS/MIC), IEEE, Oct. 27, 2013 (Oct. 27, 2013), pp. 1-10, XP032601445, DOI: 10 .1109 / NSSMIC. 2013. 6829833, [retrieved on Jun. 10, 2014].

\* cited by examiner

SOLID-STATE IMAGING ELEMENT, IMAGING DEVICE, AND CONTROL METHOD FOR SOLID-STATE IMAGING ELEMENT

TECHNICAL FIELD

The present technology relates to a solid-state imaging element, an imaging device, and a control method for the solid-state imaging element. More specifically, the present technology relates to a solid-state imaging element, an imaging device, and a control method for the solid-state imaging element control in each of which an amount of incident light is compared with a threshold value.

BACKGROUND ART

Conventionally, a synchronous solid-state imaging element that captures image data (frame) in synchronization with a synchronization signal such as a vertical synchronization signal or the like has been used in an imaging device or the like. In this general synchronous solid-state imaging element, image data can be acquired only in every cycle of the synchronization signal (e.g., 1/60 seconds), and therefore, it is difficult to cope with a case where higher speed processing is required in fields related to a user interface and the like of automatic operation and a wearable device. Accordingly, there is a proposed non-synchronous solid-state imaging element provided with an address event detection circuit in which a fact that a change amount of luminance exceeds a threshold value is detected per pixel address in real time as an address event (see Patent Document 1, for example). As a test method for operation of this solid-state imaging element, it is possible to exemplify a test method of placing, for example, a modulation light source that emits pulsed light and analyzing a detection result during emission of the pulsed light.

CITATION LIST

Patent Document

Patent Document 1: Japanese Patent Application National Publication (Laid-Open) No. 2016-533140

SUMMARY OF THE INVENTION

Problems to be Solved by the Invention

In a non-synchronous solid-state imaging element described above, a defective pixel having an abnormality can be identified by analyzing a detection result during emission of pulsed light. However, this test method requires a modulation light source and a device that controls the modulation light source, and therefore, there is a possibility that a system scale is increased and it becomes difficult to perform a test.

The present technology is created in view of such a situation, and directed to facilitating identification of a defective pixel in a solid-state imaging element that detects an address event.

Solutions to Problems

The present technology is made to solve the above-described problems, and a first aspect thereof is a solid-state imaging element and a control method therefor, in which the solid-state imaging element includes: an address event detecting unit that detects, as an address event, a fact that an absolute value of a change amount of luminance exceeds a predetermined threshold value with regard to each of a plurality of pixels, and outputs a detection signal indicating a result of the detection; a detection frequency acquisition unit that acquires a detection frequency of the address event with regard to each of the plurality of pixels; and a defective pixel identification unit that identifies, on the basis of a statistic of the detection frequency, a defective pixel where an abnormality has occurred among the plurality of pixels. This configuration brings an operational advantage that the defective pixel is identified on the basis of the statistic of the detection frequency.

Furthermore, in the first aspect, an invalidation setting unit that invalidly sets output of the detection signal corresponding to the defective pixel may be further provided. This configuration brings an operational advantage that output of the defective pixel is invalidated.

Furthermore, in the first aspect, the address event detecting unit includes an address event detection circuit for each of the plurality of pixels, the address event detection circuit may include: a current-voltage conversion circuit that converts, into a voltage signal, photocurrent generated by photoelectric conversion; a subtractor that outputs, as a differential signal, a change amount of the voltage signal by subtraction; and a quantizer that generates a signal indicating a comparison result between the differential signal and the threshold value and outputs the signal as the detection signal. This configuration brings an operational advantage that a detection signal is generated from the photocurrent.

Furthermore, in the first aspect, the address event detection circuit may further include a transistor that cuts off a power source of the current-voltage conversion circuit, the subtractor, and the quantizer in accordance with a setting of the invalidation setting unit. This configuration brings an operational advantage that the power source of the current-voltage conversion circuit, the subtractor, and the quantizer is cut off.

Furthermore, in this first aspect, the address event includes an ON event and an OFF event, the detection signal includes a detection signal of the OFF event and a detection signal of the ON event, the address event detection circuit may include: a first logic gate that cuts off the detection signal of the ON event from the quantizer in accordance with the enable signal; and a second logic gate that cuts off the detection signal of the OFF event from the quantizer in accordance with the enable signal. This configuration brings an operational advantage that the detection signal of the ON event and the detection signal of the OFF event are individually cut off.

Furthermore, in the first aspect, further provided is an address holding unit that holds an address of the defective pixel, in which the setting unit may read the address from the address holding unit and may invalidly set output of the detection signal corresponding to the address. This configuration brings an operational advantage that the output of the detection signal corresponding to the held address is invalidly set.

Furthermore, in the first aspect, the address event detection circuit further includes an enable signal holding unit that holds an enable signal indicating whether or not to validate the output of the detection signal corresponding to the address event detection circuit, and the setting unit may invalidly set the output of the detection signal by the enable signal. This configuration brings an operational advantage that the enable signal is held per pixel.

Furthermore, in the first aspect, the statistic includes an average value, and the defective pixel identification unit may identify, as the defective pixel, a pixel having the detection frequency deviated from the average value. This configuration brings an operational advantage that a pixel having the detection frequency deviated from the average value is identified as the defective pixel.

Furthermore, a second aspect of the present technology is an imaging device including: an address event detecting unit that detects, as an address event, a fact that an absolute value of a change amount of luminance exceeds a predetermined threshold value with regard to each of a plurality of pixels, and outputs a detection signal indicating a result of the detection; a detection frequency acquisition unit that acquires a detection frequency of the address event with regard to each of the plurality of pixels; a defective pixel identification unit that identifies, on the basis of a statistic of the detection frequency, a defective pixel where an abnormality has occurred among the plurality of pixels; and an image processing unit that processes image data including the detection signal. This brings an operational advantage that the defective pixel is identified on the basis of the statistic of the detection frequency, and the image data is processed.

Effects of the Invention

According to the present technology, it is possible to provide an excellent effect that a defective pixel can be easily identified in a solid-state imaging element that detects an address event. Note that the effect recited herein is not constantly limited and may include any one of effects recited in the present disclosure.

MODE FOR CARRYING OUT THE INVENTION

In the following, modes for carrying out the present technology (hereinafter referred to as "embodiments") will be described. The description will be provided in the following order.

1. First Embodiment (Example of Identifying Defective Pixel on Basis of Statistic)
2. Second Embodiment (Example of Identifying Defective Pixel on Basis of Statistic, and Cutting Off Output)
3. Third Embodiment (Example of Identifying Defective Pixel on Basis of Statistic, and Holding Enable Signal per Pixel)
4. Exemplary Application to Moving Object 1. First Embodiment

[Exemplary Configuration of Imaging Device]

Figure 1:
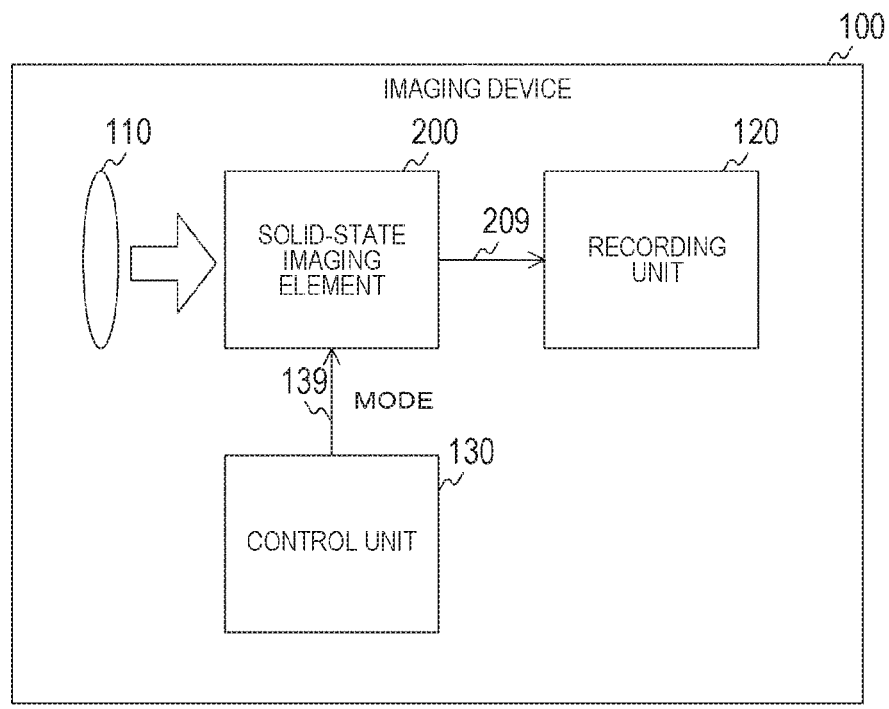
FIG. 1 is a block diagram illustrating an exemplary configuration of an imaging device according to a first embodiment of the present technology.

FIG. 1 is a block diagram illustrating an exemplary configuration of an imaging device 100 in a first embodiment of the present technology. The imaging device 100 includes an imaging lens 110, a solid-state imaging element 200, a recording unit 120, and a control unit 130. As the imaging device 100, a camera mounted on a wearable device, a vehicle-mounted camera, or the like is assumed.

The imaging lens 110 collects incident light and guides the collected light to the solid-state imaging element 200.

The solid-state imaging element 200 detects, as an address event, a fact that an absolute value of a change amount of luminance exceeds a threshold value with regard to each of a plurality of pixels. This address event includes, for example: an ON event indicating that an increase amount of the luminance exceeds an upper limit threshold value; and an OFF event indicating that a decrease amount of the luminance is smaller than a lower limit threshold value that is less than the upper limit threshold value. Then, the solid-state imaging element 200 generates, per pixel, a detection signal indicating a detection result of the address event. Each detection signal includes: an ON event detection signal VCH indicating presence or absence of an ON event; and an OFF event detection signal VCL indicating presence or absence of an OFF event. Note that the solid-state imaging element 200 detects presence or absence of both the ON event and the OFF event, but can also detect only one thereof.

The solid-state imaging element 200 executes predetermined signal processing such as image recognition processing and the like for image data including the detection signal, and outputs processed data to the recording unit 120 via a signal line 209.

The recording unit 120 records the data from the solid-state imaging element 200. The control unit 130 controls the solid-state imaging element 200 such that the solid-state imaging element 200 captures image data.

[Exemplary Configuration of Solid-State Imaging Element]

Figure 2:
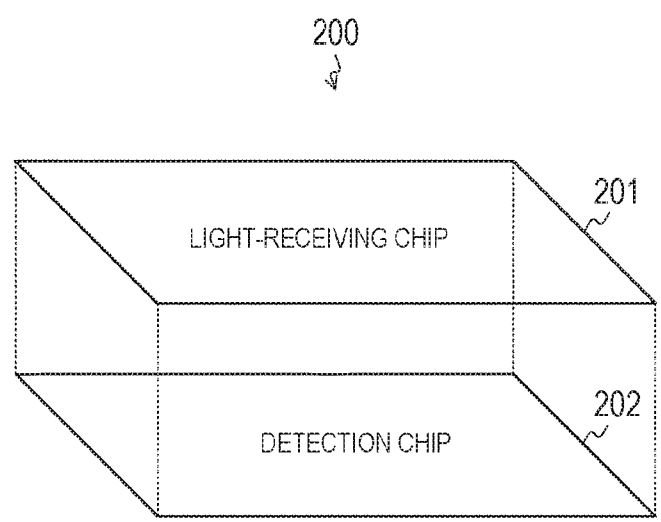
FIG. 2 is a view illustrating an exemplary laminated structure of the solid-state imaging element in the first embodiment of the present technology.

FIG. 2 is a view illustrating an exemplary laminated structure of the solid-state imaging element 200 in the first embodiment of the present technology. The solid-state imaging element 200 includes a detection chip 202 and a light-receiving chip 201 laminated on the detection chip 202. These chips are electrically connected via a connecting portion such as a via or the like. Note that the chips can be connected by Cu—Cu bonding or a bump, besides the via.

Figure 3:
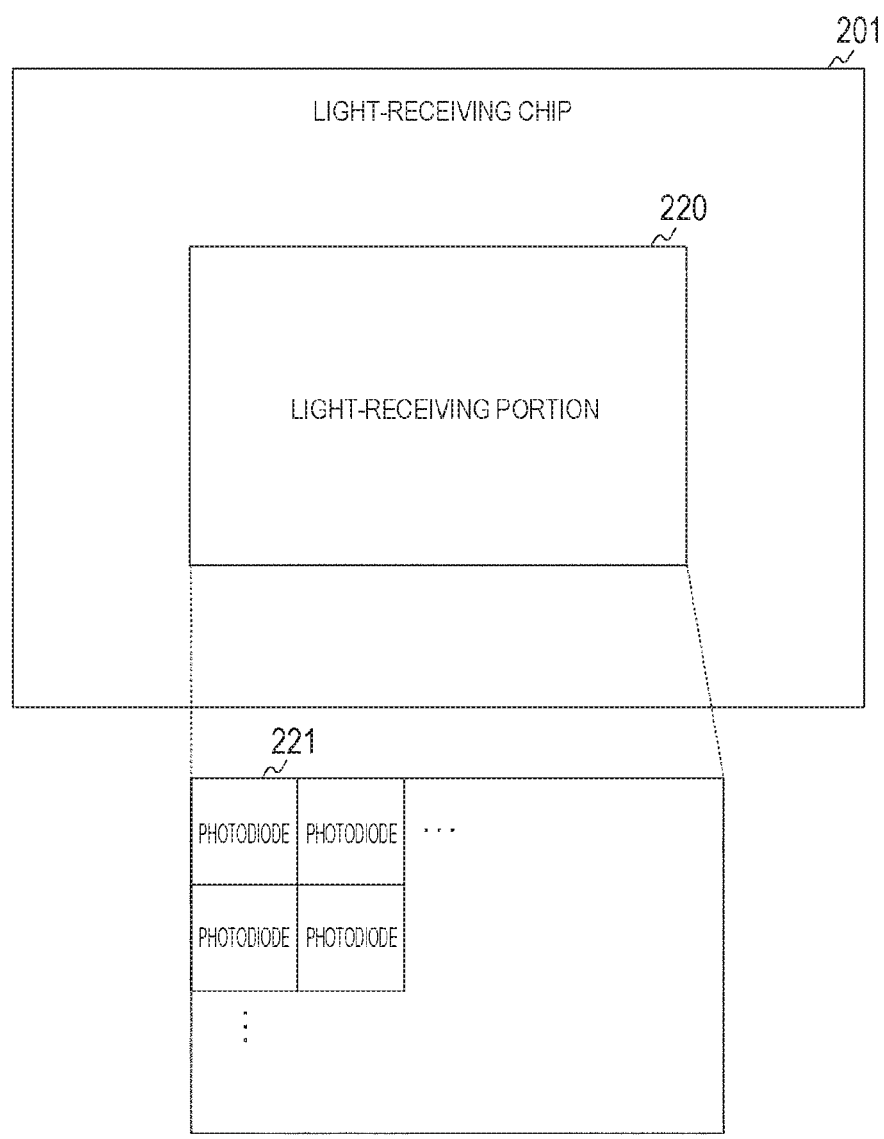
FIG. 3 is an exemplary plan view of a light-receiving chip in the first embodiment of the present technology.

FIG. 3 is an exemplary plan view of the light-receiving chip 201 in the first embodiment of the present technology. The light-receiving chip 201 is provided with a light-receiving portion 220. The light-receiving portion 220 has a plurality of photodiodes 221 arrayed in a two-dimensional grid form. Each photodiode 221 photoelectrically converts incident light and generates photocurrent. A pixel address including a row address and a column address is allocated to each of these photodiodes 221 and treated as a pixel.

Figure 4:
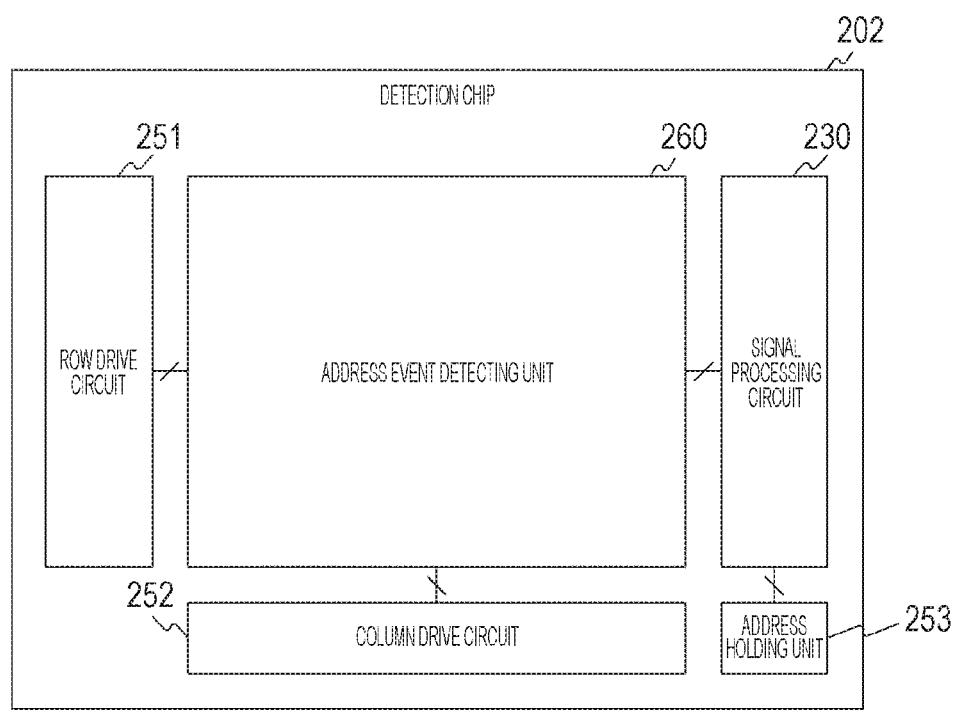
FIG. 4 is an exemplary plan view of a detection chip in the first embodiment of the present technology.

FIG. 4 is an exemplary plan view of the detection chip 202 in the first embodiment of the present technology. The detection chip 202 is provided with a signal processing circuit 230, a row drive circuit 251, a column drive circuit 252, an address holding unit 253, and an address event detecting unit 260.

The address event detecting unit 260 detects, as an address event, a fact that an absolute value of a change amount of luminance exceeds a predetermined threshold value with regard to each of the plurality of photodiodes 221 (pixels). Then, the address event detecting unit 260 generates, per pixel, a detection signal indicating a detection result of the address event, and outputs the detection signal to the signal processing circuit 230 in accordance with an enable signal.

Here, the enable signal is a signal indicating whether or not to validate output of a detection signal with regard to each of the plurality of pixels. In a case where the enable signal has a value that validates the output, a detection signal is output from a corresponding pixel. On the other hand, in a case where the enable signal has a value that invalidates the output, a detection signal is not output from the corresponding pixel.

The row drive circuit 251 selects a row address and causes the address event detecting unit 260 to output a detection signal corresponding to the row address.

The column drive circuit 252 selects a column address and causes the address event detecting unit 260 to output a detection signal corresponding to the column address.

The address holding unit 253 holds a pixel address of a defective pixel in which an abnormality has occurred.

The signal processing circuit 230 executes the predetermined signal processing for a detection signal from the address event detecting unit 260. The signal processing circuit 230 arrays detection signals as pixel signals in a two-dimensional grid form and acquires image data. Then, the signal processing circuit 230 executes signal processing such as image recognition processing and the like for the image data.

Furthermore, the signal processing circuit 230 acquires, per pixel, a detection frequency of an address event and identifies a defective pixel on the basis of a statistic of the detection frequency. Then, the signal processing circuit 230 holds a pixel address of the defective pixel in the address holding unit 253. Furthermore, the signal processing circuit 230 generates an enable signal per pixel and supplies the enable signal to the address event detecting unit 260. Among these enable signals, an enable signal corresponding to the defective pixel is set to a value that invalidates output.

Figure 5:
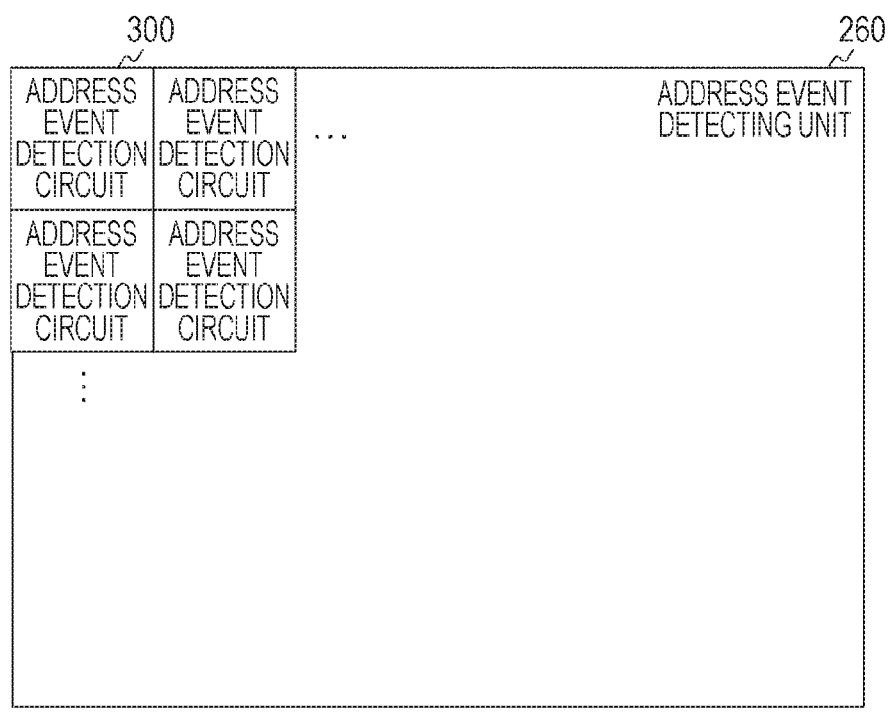
FIG. 5 is an exemplary plan view of an address event detecting unit in the first embodiment of the present technology.

FIG. 5 is an exemplary plan view of the address event detecting unit 260 in the first embodiment of the present technology. This address event detecting unit 260 has a plurality of address event detection circuits 300 arrayed in a two-dimensional grid form. A pixel address is allocated to each of the address event detection circuits 300, and each address event detection circuit is connected to each photodiode 221 having the same address.

The address event detection circuit 300 quantizes a voltage signal according to photocurrent from a corresponding photodiode 221, and outputs the quantized signal as a detection signal in accordance with an enable signal.

[Exemplary Configuration of Address Event Detection Circuit]

Figure 6:
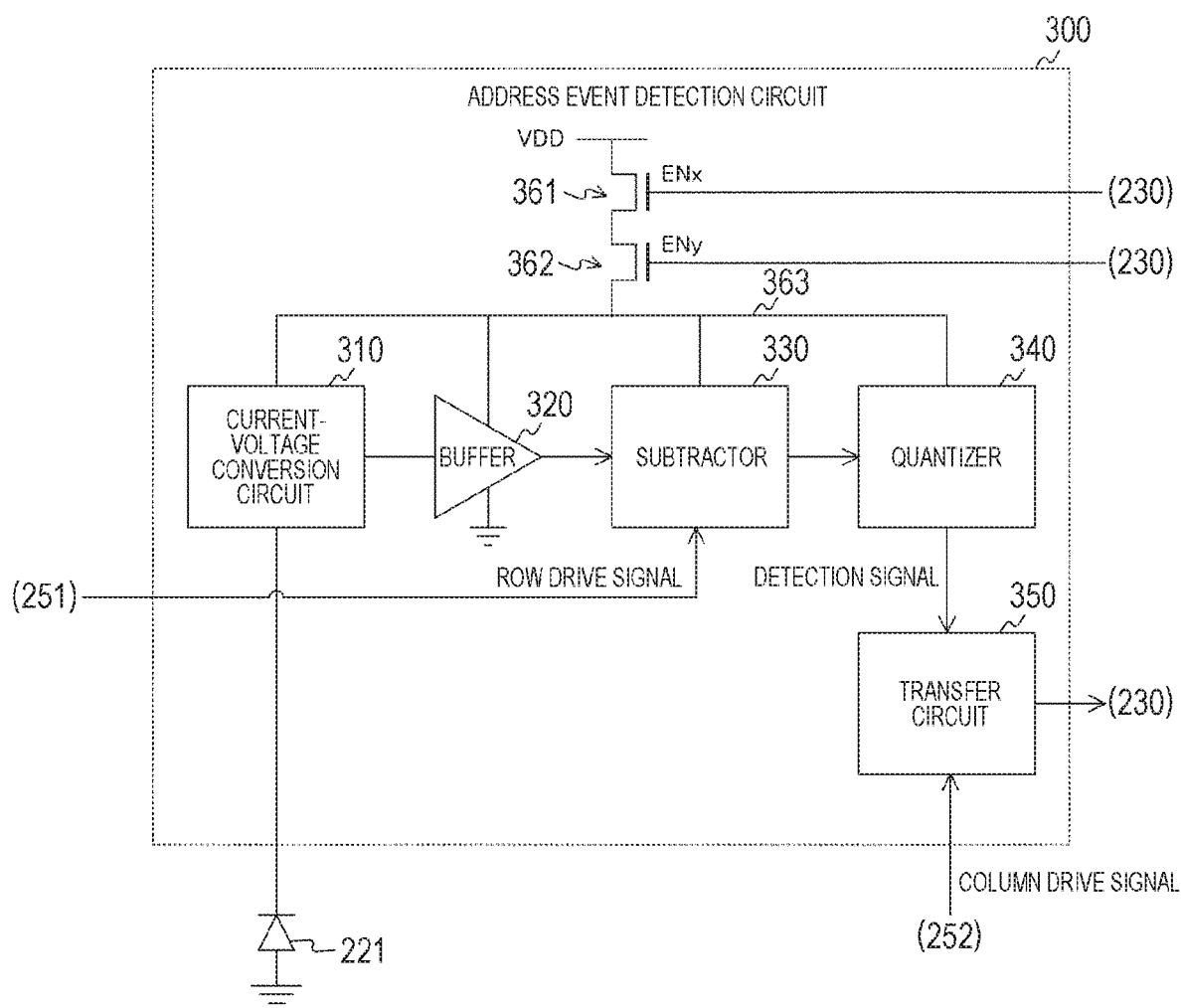
FIG. 6 is a block diagram illustrating an exemplary configuration of an address event detection circuit in the first embodiment of the present technology.

FIG. 6 is a block diagram illustrating an exemplary configuration of the address event detection circuit 300 in the first embodiment of the present technology. This address event detection circuit 300 includes a current-voltage conversion circuit 310, a buffer 320, a subtractor 330, a quantizer 340, a transfer circuit 350, and N-type transistors 361 and 362.

The current-voltage conversion circuit 310 converts, into a voltage signal, a current signal from a corresponding photodiode 221. The current-voltage conversion circuit 310 supplies the voltage signal to the buffer 320.

The buffer 320 outputs the received voltage signal to the subtractor 330. This buffer 320 can improve drive force that drives a subsequent stage. Furthermore, the buffer 320 can secure isolation from noise accompanied by switching operation in the subsequent stage.

The subtractor 330 obtains a change amount of a correction signal by subtraction. The subtractor 330 supplies the change amount to the quantizer 340 as a differential signal.

The quantizer 340 converts (in other words, quantizes) an analog differential signal into a digital detection signal by comparing the differential signal with a predetermined threshold value. The quantizer 340 compares the differential signal with each of the upper limit threshold value and the lower limit threshold value, and supplies each of comparison results thereof to the transfer circuit 350 as a 2-bit detection signal. Note that the quantizer 340 is an example of a comparator described in the claims.

The N-type transistors 361 and 362 cut off a power source of the current-voltage conversion circuit 310, the buffer 320, the subtractor 330, the quantizer 340, and the transfer circuit 350 in accordance with an enable signal. As these N-type transistors, for example, metal-oxide-semiconductor (MOS) transistors are used. The N-type transistors 361 and 362 are connected in series between a power source terminal and a power source line 363, and enable signals ENx and ENy from the signal processing circuit 230 are received in gates thereof, respectively. The power source line 363 is connected to a power source terminal in each of the current-voltage conversion circuit 310, the buffer 320, the subtractor 330, and the quantizer 340. Note that the N-type transistors 361 and 362 are examples of a transistor described in the claims.

Here, the enable signals ENx and ENy are signals that command whether or not to validate output of a pixel having a pixel address (x, y). For example, in a case of validating the output, a high level is set to both of the enable signals ENx and ENy, and in a case of invalidating the output, a low level is set to at least one thereof.

The transfer circuit 350 transfers a detection signal to the signal processing circuit 230 in accordance with a column drive signal from the column drive circuit 252.

[Exemplary Configurations of Current-Voltage Conversion Circuit and Buffer]

Figure 7:
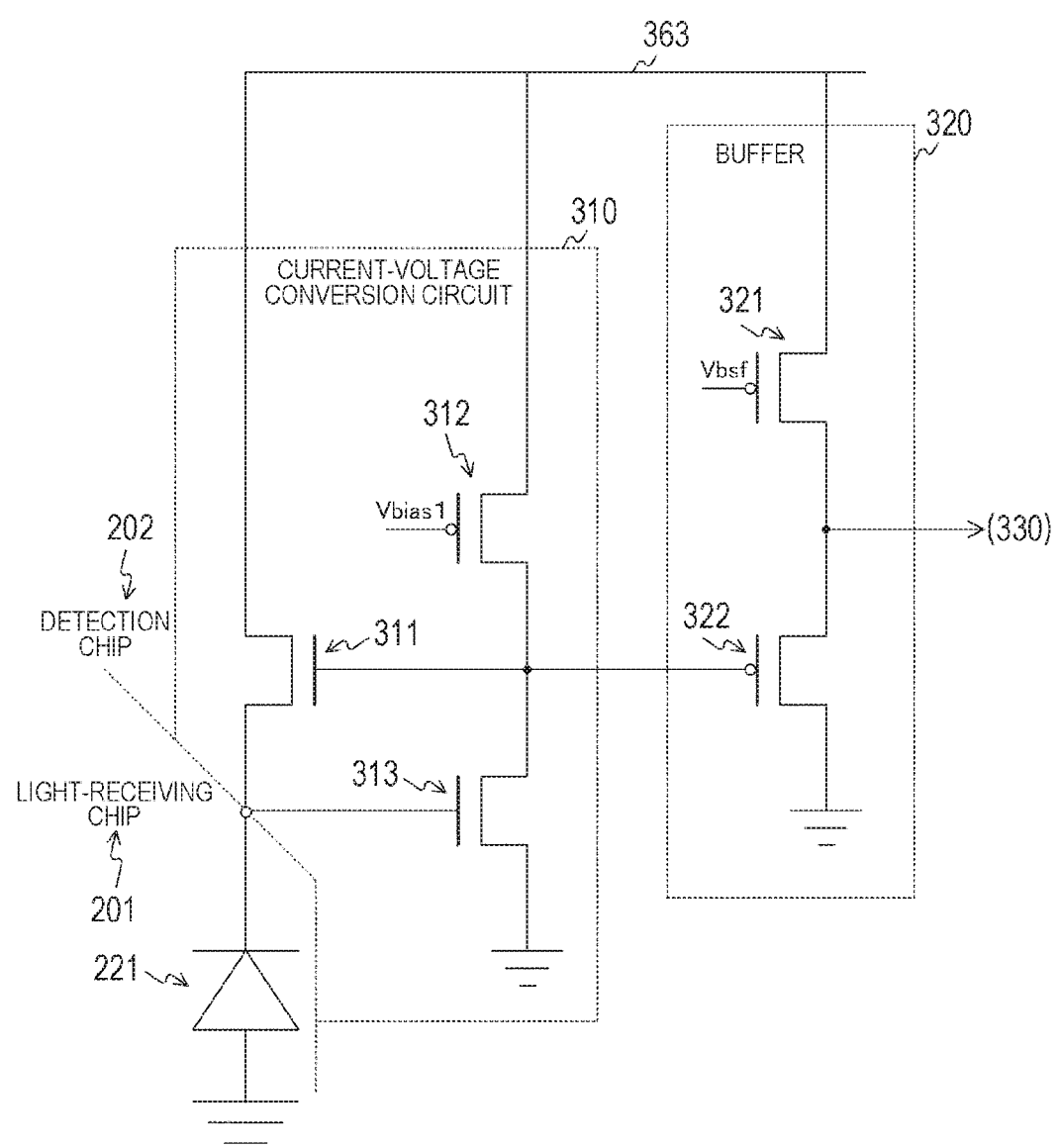
FIG. 7 is a circuit diagram illustrating exemplary configurations of a current-voltage conversion circuit and a buffer in the first embodiment of the present technology.

FIG. 7 is a circuit diagram illustrating exemplary configurations of the current-voltage conversion circuit 310 and the buffer 320 in the first embodiment of the present technology.

The current-voltage conversion circuit 310 includes N-type transistors 311 and 313 and a P-type transistor 312. As these transistors, MOS transistors are used, for example.

The N-type transistor 311 has a source connected to a cathode of a photodiode 221, and has a drain connected to the power source line 363. The P-type transistor 312 and the N-type transistor 313 are connected in series between the power source line 363 and a ground terminal. Furthermore, a connection point between the P-type transistor 312 and the N-type transistor 313 is connected to a gate of the N-type transistor 311 and an input terminal of the buffer 320. Furthermore, predetermined bias voltage Vbias1 is applied to a gate of the P-type transistor 312.

The N-type transistors 311 and 313 each have a drain connected to a power source side, and such a circuit is called a source follower. A current signal from the photodiode 221 is converted into a voltage signal by these two source followers connected in a loop. Furthermore, the P-type transistor 312 supplies constant current to the N-type transistor 313.

Furthermore, a ground of the light-receiving chip 201 and a ground of the detection chip 202 are separated from each other in order to prevent interference.

The buffer 320 includes P-type transistors 321 and 322. As these transistors, MOS transistors are used, for example.

The P-type transistors 321 and 322 are connected in series between the power source line 363 and a ground terminal. Furthermore, predetermined bias voltage Vbsf is applied to a gate of the P-type transistor 321. The P-type transistor 322 has a gate connected to an output terminal of the current-voltage conversion circuit 310. A correction signal is output to the subtractor 330 from a connection point of the P-type transistors 321 and 322.

[Exemplary Configurations of Subtractor and Quantizer]

Figure 8:
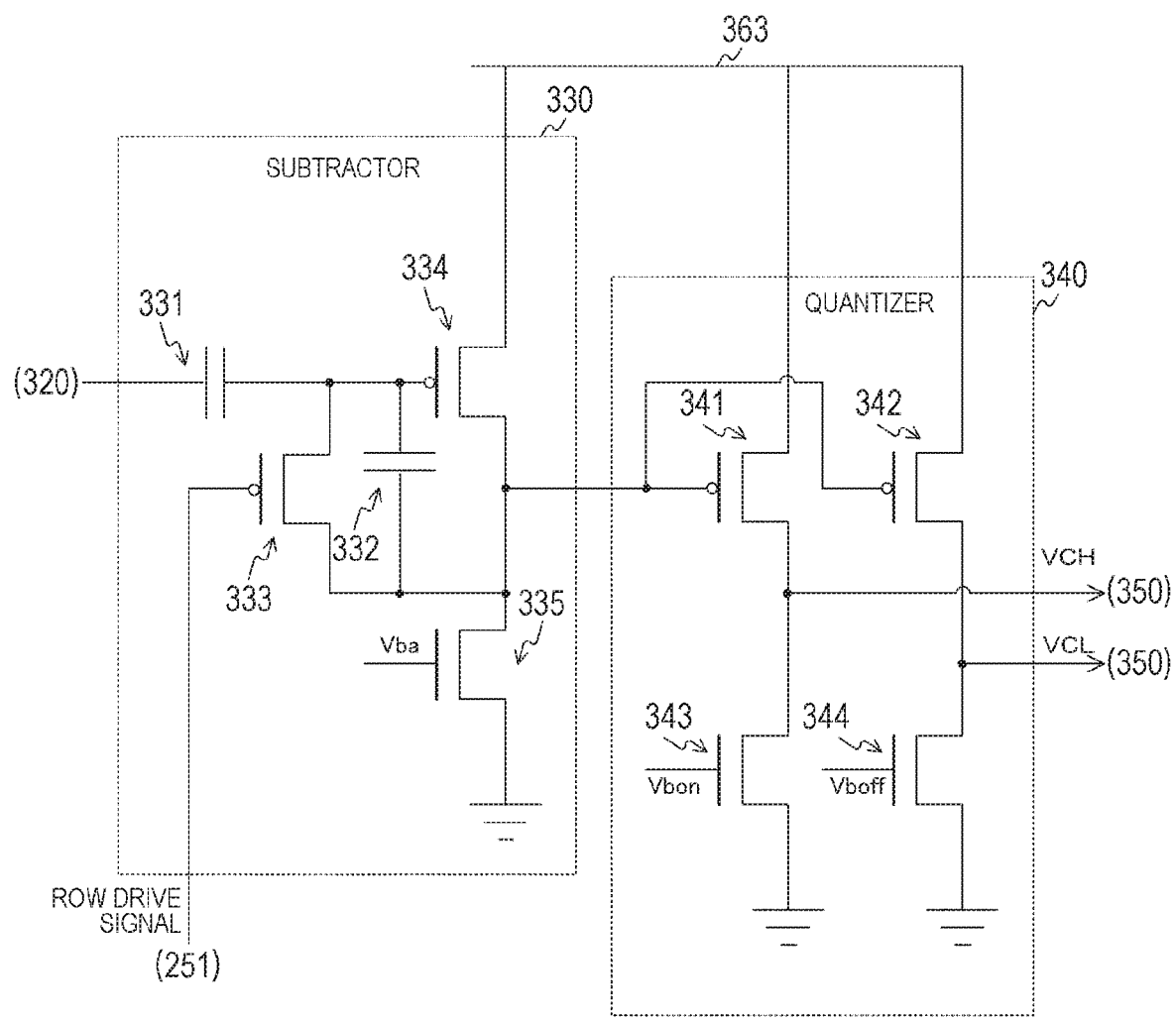
FIG. 8 is a circuit diagram illustrating exemplary configurations of a subtractor and a quantizer in the first embodiment of the present technology.

FIG. 8 is a circuit diagram illustrating exemplary configurations of the subtractor 330 and the quantizer 340 in the first embodiment of the present technology. The subtractor 330 includes capacitors 331 and 332, P-type transistors 333 and 334, and an N-type transistor 335.

The P-type transistor 334 and the N-type transistor 335 are connected in series between the power source line 363 and a ground terminal. The P-type transistor 334 and the N-type transistor 335 function as inverters each inverting an input signal while using a gate of the P-type transistor 334 as an input terminal and using a connection point of the P-type transistor 334 and the N-type transistor 335 as an output terminal.

The capacitor 331 has one end connected to an output terminal of the buffer 320 and the other end connected to the input terminal of the inverter (that is, the gate of the P-type transistor 334). The capacitor 332 is connected in parallel to the inverter. The P-type transistor 333 opens/closes a path connecting both ends of the capacitor 332 in accordance with a row drive signal.

When the P-type transistor 333 is turned on, voltage signal $V_{init}$ is received on the buffer 320 side of the capacitor 331, and an opposite side thereof functions as a virtual ground terminal. This virtual ground terminal has potential of zero for convenience. At this time, potential $Q_{init}$ accumulated in the capacitor 331 is represented by the following Expression while defining capacitance of the capacitor 331 as C1. On the other hand, since both ends of the capacitor 332 are short-circuited, accumulated electric charge is zero.

$$Q_{init} = C1 \times V_{init} \quad \text{Expression 1}$$

Next, considering a case where the P-type transistor 333 is turned off and voltage on the buffer 320 side of the capacitor 331 is changed and becomes $V_{after}$, electric charge $Q_{after}$ accumulated in the capacitor 331 is represented by the following Expression.

$$Q_{after} = C1 \times V_{after} \quad \text{Expression 2}$$

On the other hand, electric charge Q2 accumulated in the capacitor 332 is represented by the following Expression while defining output voltage as $V_{out}$.

$$Q2 = -C2 \times V_{out} \quad \text{Expression 3}$$

At this time, a total electric charge amount of the capacitors 331 and 332 is not changed, and therefore, the following Expression is established.

$$Q_{init} = Q_{after} + Q2 \quad \text{Expression 4}$$

When Expressions 1 to 3 are plugged into Expression 4 for transform, the following Expression can be obtained.

$$V_{out} = -(C1/C2) \times (V_{after} - V_{init}) \quad \text{Expression 5}$$

Expression 5 represents subtraction operation of a voltage signal, and a gain of a subtraction result becomes C1/C2. Since the gain is generally desired to be maximized, it is preferable to design C1 large and C2 small. On the other hand, when C2 is too small, kTC noise is increased, and there is a possibility that noise characteristics is deteriorated, and therefore, capacitance reduction of C2 is limited to a range that can allow the noise. Furthermore, since the address event detection circuit 300 including the subtractor 330 is mounted in each pixel, the capacitance C1 or C2 has an area constraint. Considering the above, for example, C1 is set to a value of 20 to 200 femtofarads (fF), and C2 is set to a value of 1 to 20 femtofarads (fF).

The quantizer 340 includes: P-type transistors 341 and 342; and N-type transistors 343 and 344. As these transistors, MOS transistors are used, for example.

The P-type transistor 341 and the N-type transistor 343 are connected in series between the power source line 363 and the ground terminal, and the P-type transistor 342 and the N-type transistor 344 are also connected in series between the power source line 363 and the ground terminal. Furthermore, the P-type transistors 341 and 342 each have a gate connected to an output terminal of the subtractor 330. Bias voltage Vbon indicating the upper limit threshold value is applied to the gate of the N-type transistor 343, and bias voltage Vboff indicating the lower limit threshold value is applied to the gate of the N-type transistor 344.

A connection point of the P-type transistor 341 and the N-type transistor 343 is connected to the transfer circuit 350, and voltage at this connection point is output as an ON event detection signal VCH. A connection point of the P-type transistor 342 and the N-type transistor 344 is also connected to the transfer circuit 350, and voltage at this connection point is output as an OFF event detection signal VCL. With such connections, in a case where a differential signal exceeds the upper limit threshold value, the quantizer 340 outputs the high-level ON event detection signal VCH, and in a case where the differential signal is smaller than the lower limit threshold value, the quantizer 340 outputs the low-level OFF event detection signal VCL.

Note that the photodiodes 221 are arranged on the light-receiving chip 201 and the circuits in the subsequent stage are arranged on the detection chip 202, but the circuits arranged on the respective chips are not limited to this configuration. For example, the photodiodes 221 and the N-type transistors 311 and 313 can be arranged on the light-receiving chip 201, and others can be arranged on the detection chip 202. Furthermore, the photodiodes 221 and the current-voltage conversion circuit 310 can be arranged on the light-receiving chip 201, and others can be arranged on the detection chip 202. Furthermore, the photodiodes 221, the current-voltage conversion circuit 310, and the buffer 320 can be arranged on the light-receiving chip 201, and the others can be arranged on the detection chip 202. Furthermore, the photodiodes 221, the current-voltage conversion circuit 310, the buffer 320, and the capacitor 331 can be arranged on the light-receiving chip 201, and the others can be arranged on the detection chip 202. Furthermore, the photodiodes 221, the current-voltage conversion circuit 310, the buffer 320, the subtractor 330, and the quantizer 340 can be arranged on the light-receiving chip 201, and others can be arranged on the detection chip 202.

[Exemplary Configuration of Signal Processing Circuit]

Figure 9:
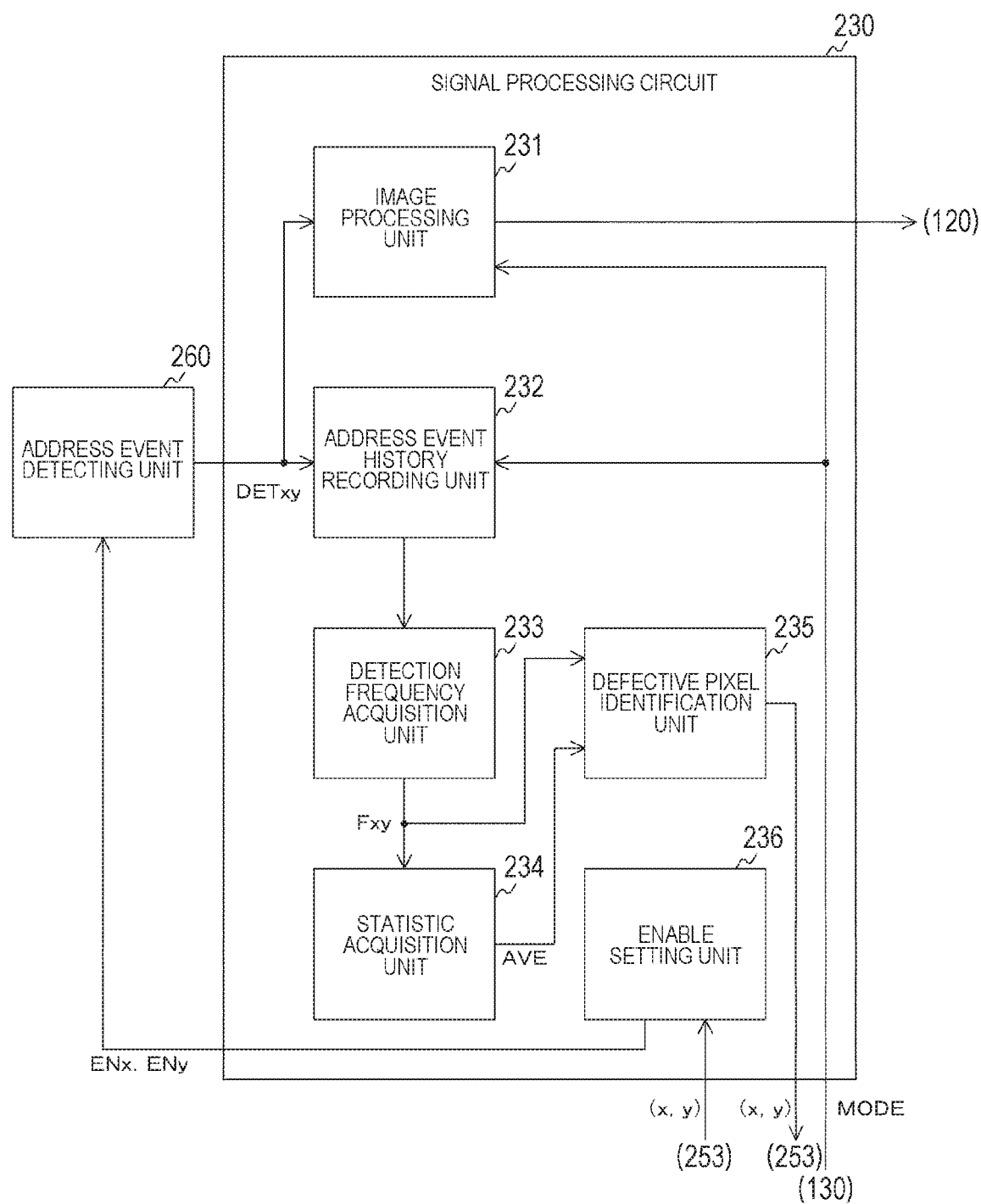
FIG. 9 is a block diagram illustrating an exemplary configuration of a signal processing circuit in the first embodiment of the present technology.

FIG. 9 is a block diagram illustrating an exemplary configuration of the signal processing circuit 230 in the first embodiment of the present technology. The signal processing circuit 230 includes an image processing unit 231, an address event history recording unit 232, a detection frequency acquisition unit 233, a statistic acquisition unit 234, a defective pixel identification unit 235, and an enable setting unit 236. A mode signal MODE from the control unit 130 is received in the image processing unit 231 and the address event history recording unit 232.

Here, the mode signal MODE is a signal that designates either a test mode or a normal mode. Among these, the test mode is a mode of executing a test for own operation of the imaging device 100. On the other hand, the normal mode is a mode of executing predetermined processing such as image recognition and the like without the imaging device 100 executing a test. The test mode is set by user's operation or execution of a predetermined application. It is desirable that the test mode be set under a condition that there is almost no luminance change (such as during shipping, repair, or the like). Furthermore, in the test mode, it is desirable that the solid-state imaging element 200 be shielded from light with a mechanical shutter or the like so as not to change the luminance.

In the normal mode, the image processing unit 231 executes the predetermined processing such the image recognition and the like and outputs a processing result to the recording unit 120. On the other hand, in the test mode, the image processing unit 231 stops the processing.

In the test mode, the address event history recording unit 232 records a history of a detection signal DETxy of each pixel within a fixed period. Suffixes x and y indicate a row address and a column address of a pixel.

The detection frequency acquisition unit 233 refers to the history and acquires a detection frequency of an address event per pixel. The detection frequency is calculated, per pixel, for example, by dividing the number of times of detection of the address events of the pixel within a certain period by a unit time. The number of times of detection is counted without differentiation between the ON event and the OFF event. For example, in a case where the ON event is detected three times and the OFF event is detected twice within the certain period, the number of detection times is five. The detection frequency acquisition unit 233 supplies a detection frequency Fxy of each pixel to the statistic acquisition unit 234 and the defective pixel identification unit 235.

The statistic acquisition unit 234 acquires a statistic of the detection frequency Fxy. The statistic acquisition unit 234 calculates, for example, an average value AVE of the detection frequency Fxy, and supplies the average value to the defective pixel identification unit 235.

The defective pixel identification unit 235 identifies a defective pixel on the basis of the statistic (average value or the like) of the detection frequency Fxy. For example, the defective pixel identification unit 235 determines, per pixel, whether or not the detection frequency is a value deviated from the average value in accordance with whether or not the following Expression is satisfied.

$$Fxy>AVE+Th \qquad \text{Expression 6}$$

In the above Expression, Th represents a predetermined real number.

Here, in an ideal pixel, no address event is detected in a case where there is no luminance change. However, in an actual pixel, an address event is sometimes erroneously detected although there is no luminance change caused by noise of an element in the pixel and a phenomenon in which electric charge to be held in capacitance in the pixel is leaked by leakage current. As the noise in the pixel, an amplitude of random telegraph signal (RTS) noise is particularly large, and therefore, influence thereof is large. When erroneous detection occurs, there is a possibility that sometimes a meaningless detection signal interferes with the processing such as the image recognition and the like, and sometimes a data band of an interface that transmits a detection signal is compressed. Furthermore, there is a possibility that power consumption of the solid-state imaging element 200 is increased by transmission and processing of the erroneously-detected detection signal.

To solve such problems, it is desirable that a pixel in which erroneous detection frequently occurs be set as a defective pixel having an abnormality and the pixel be invalidated. As described above, since there is almost no luminance change in the test mode, an address event detected at this time is an erroneously-detected one. A pixel having an erroneous detection frequency deviated from the average value is treated, in the solid-state imaging element 200, as a defective pixel where an abnormality has occurred.

For example, a pixel satisfying Expression 6 is a pixel having an erroneous detection frequency deviated from the average value. Therefore, the defective pixel identification unit 235 makes a determination, per pixel, on whether or not Expression 6 is satisfied. Then, the defective pixel identification unit 235 sets, as a defective pixel, a pixel that satisfies Expression 6 and causes the address holding unit 253 to hold a pixel address (x, y) of the defective pixel.

The enable setting unit 236 generates, per pixel, an enable signal and supplies the same. In the normal mode, the enable setting unit 236 reads a pixel address of a defective pixel from the address holding unit 253 and invalidly sets output of the defective pixel by an enable signal, and as for each of other pixels, the enable setting unit 236 validly sets output thereof by an enable signal. Then, the enable setting unit 236 supplies each of the generated enable signals to the address event detecting unit 260. Note that the enable signal setting unit 236 is an example of an invalidation setting unit described in the claims.

Note that the imaging device 100 does not perform a test during execution of processing to be performed in the normal mode, but the configuration is not limited to this configuration. For example, a test can be performed also in a background during execution of the processing to be performed in the normal mode. In this case, it is desirable that the signal processing circuit 230 execute a test in an environment in which luminance is hardly changed (such as when a vehicle is stopped at night, or the like).

Furthermore, the signal processing circuit 230 performs a test, but can also perform a part or all of processing to be executed in the test (acquisition of a detection frequency and a statistic thereof) in a circuit or a device outside the signal processing circuit 230.

Furthermore, the statistic acquisition unit 234 acquires the average value of the detection frequency as the statistic, but can also acquire a statistic other than the average value (variance, a mode value, and the like). In a case of using the variance, for example, the statistic acquisition unit 234 calculates the variance per pixel, and the defective pixel identification unit 235 identifies, as a defective pixel, a pixel having the variance larger than a predetermined value.

Figure 10:
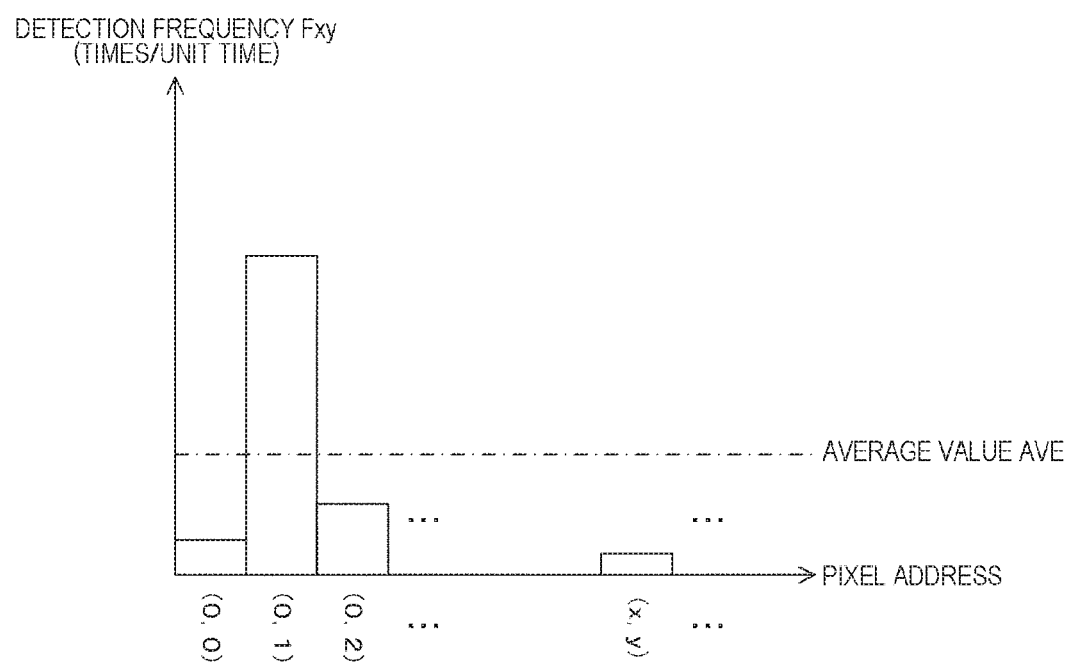
FIG. 10 is a graph illustrating an exemplary detection frequency of an address event per pixel in the first embodiment of the present technology.

FIG. 10 is a graph illustrating an exemplary detection frequency of an address event per pixel in the first embodiment of the present technology. In the drawing, a vertical axis represents the detection frequency Fxy, and a horizontal axis represents a pixel address. A dash-dot-dash line represents the average value AVE.

For example, a detection frequency of a pixel at a pixel address (0, 0) is less than the average value AVE and does not satisfy Expression 6. Therefore, a determination is made that this pixel is a normal pixel. On the other hand, for example, a detection frequency of a pixel at a pixel address (0, 1) is largely deviated from the average value AVE and satisfies Expression 6. Therefore, a determination is made that this pixel is a defective pixel.

Figure 11:
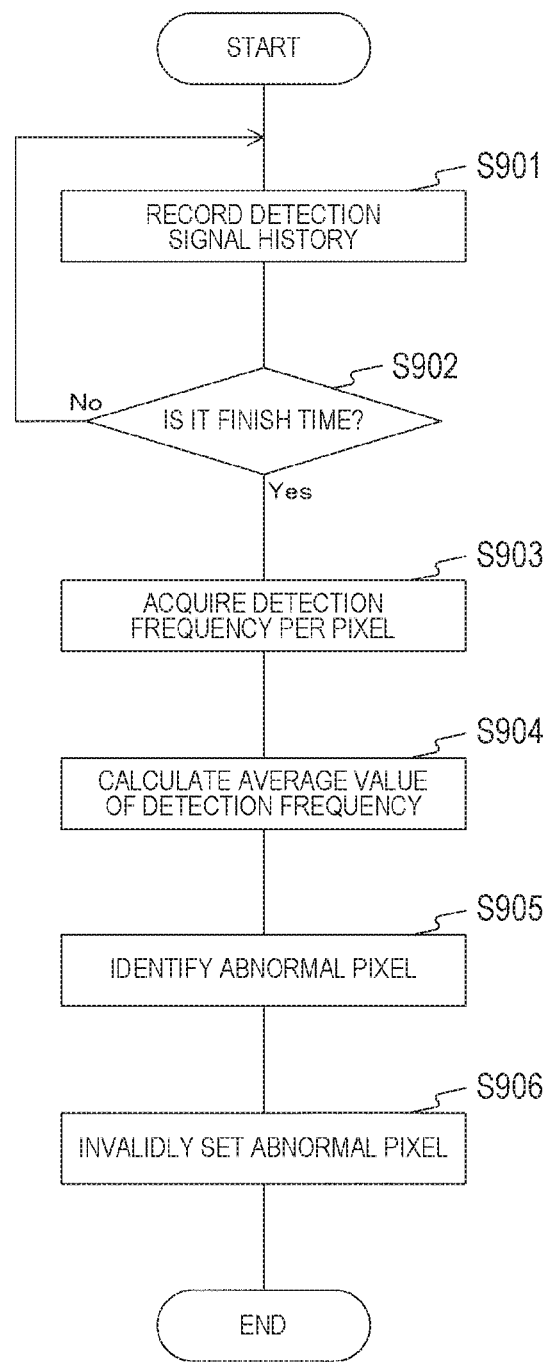
FIG. 11 is a flowchart illustrating exemplary operation of the solid-state imaging element in the first embodiment of the present technology.

FIG. 11 is a flowchart illustrating exemplary operation of the solid-state imaging element 200 in the first embodiment of the present technology. This operation is started, for example, when the test mode is set.

In the solid-state imaging element 200, the address event history recording unit 232 records a detection signal history of each pixel (step S901). Then, the address event history recording unit 232 makes a determination on whether or not the current time is finish time of a test (step S902). In a case of not being the finish time (step S902: No), the address event history recording unit 232 repeatedly executes step S901 and subsequent steps.

On the other hand, in a case of being the finish time (step S902: Yes), the detection frequency acquisition unit 233 acquires, per pixel, a detection frequency of an address event (step S903), and the statistic acquisition unit 234 calculates an average value of the detection frequency (step S904).

The defective pixel identification unit 235 identifies a defective pixel by using Expression 6 (step S905), and the enable setting unit 236 sets a value of an enable signal of the defective pixel to a value that invalidates output (step S906). After step S906, the solid-state imaging element 200 ends the operation for the test.

Thus, according to the first embodiment of the present technology, since the solid-state imaging element 200 acquires a detection frequency per pixel and identifies, on the basis of a statistic thereof, a defective pixel where an abnormality has occurred, the test can be easily performed without using a modulation light source.

2. Second Embodiment

In a first embodiment described above, a defective pixel is invalidated by cutting off a power source. However, when the power source is cut off, output of both an ON event and an OFF event is invalidated, and only one of the detection of the ON event or the detection of the OFF event cannot be invalidated. An address event detection circuit 300 of a second embodiment differs from that of the first embodiment in individually cutting off an ON event detection signal and an OFF event detection signal.

Figure 12:
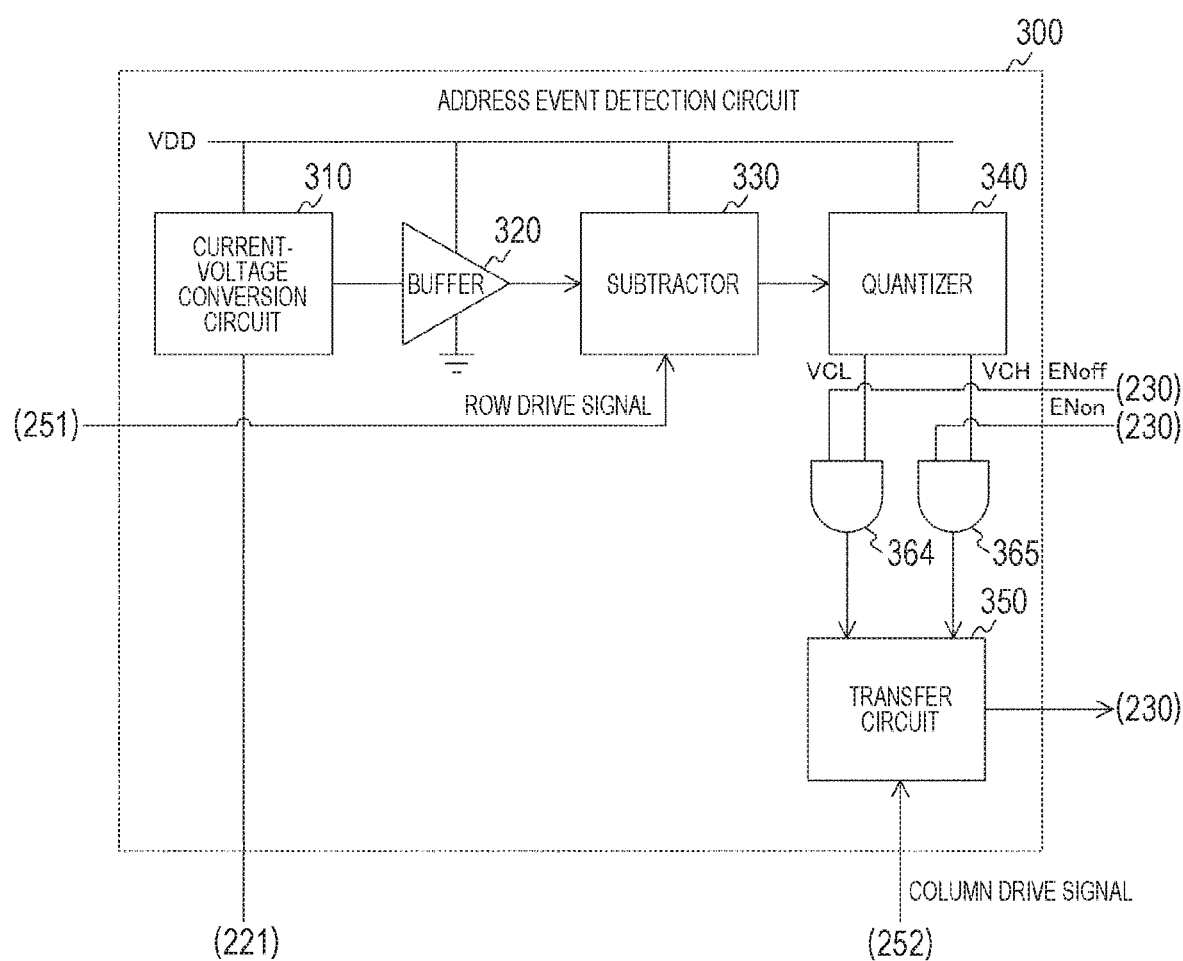
FIG. 12 is a block diagram illustrating an exemplary configuration of an address event detection circuit in a second embodiment of the present technology.

FIG. 12 is a block diagram illustrating an exemplary configuration of the address event detection circuit 300 in the second embodiment of the present technology. The address event detection circuit 300 of the second embodiment differs from that of the first embodiment in further including logical product (AND) gates 364 and 365. A 1-bit enable signal ENoff from a signal processing circuit 230 is received in the AND gate 364, and a 1-bit enable signal ENon from the signal processing circuit 230 is received in the AND gate 365. For example, in a case of validating these enable signals, a high level is set, and in a case of invalidating these enable signals, a low level is set.

The AND gate 364 outputs, to a transfer circuit, a logical product of the enable signal ENoff and an OFF event detection signal VCL from a quantizer 340. In a case where the enable signal ENoff is set to the low level, output of the OFF event detection signal VCL is cut off by the AND gate 364. Note that the AND gate 364 is an example of a second logic gate described in the claims.

The AND gate 365 outputs, to the transfer circuit, a logical product of the enable signal ENon and an ON event detection signal VCH from the quantizer 340. In a case where the enable signal ENon is set to the low level, output of the ON event detection signal VCH is cut off by the AND gate 365. Note that the AND gate 365 is an example of a first logic gate described in the claims.

Furthermore, a detection frequency acquisition unit 233 of the second embodiment individually acquires an ON event detection frequency Fon and an OFF event detection frequency Foff per pixel. Furthermore, a statistic acquisition unit 234 also individually acquires a statistic of the ON event detection frequency (average value AVEon or the like) and a statistic of the OFF event detection frequency (average value AVEoff or the like). Then, a defective pixel identification unit 235 makes a determination, per pixel, on whether or not the following Expression is satisfied.

$$Fon > AVEon + Th \qquad \text{Expression 7}$$

$$Foff > AVEoff + Th \qquad \text{Expression 8}$$

A pixel that does not satisfy either Expression 7 or Expression 8 is treated as a defective pixel. An enable setting unit 236 sets, to a low level, the enable signal ENon of the defective pixel that does not satisfy Expression 7, and sets, to the low level, the enable signal ENoff of the defective pixel that does not satisfy Expression 8. Therefore, in a case where there is an abnormality in detection of only one of the ON event or the OFF event, it is possible to invalidate output of only one thereof.

Thus, according to the second embodiment of the present technology, the AND gates 364 and 365 individually cut off output of each of the ON event detection signal and the OFF event detection signal, and therefore, in a case where there is an abnormality in detection of only one thereof, it is possible to invalidate only output thereof.

3. Third Embodiment

In a second embodiment described above, a signal processing circuit 230 reads a pixel address of a defective pixel from an address holding unit 253, generates an enable signal, and supplies the enable signal to each of pixels. However, in a pixel located distant from the signal processing circuit 230 in a layout, a wiring distance of a signal line through which the enable signal is transmitted becomes long, and there is a possibility that transmission of the enable signal is delayed. A solid-state imaging element 200 of a third embodiment differs from that of the second embodiment in holding an enable signal per pixel.

Figure 13:
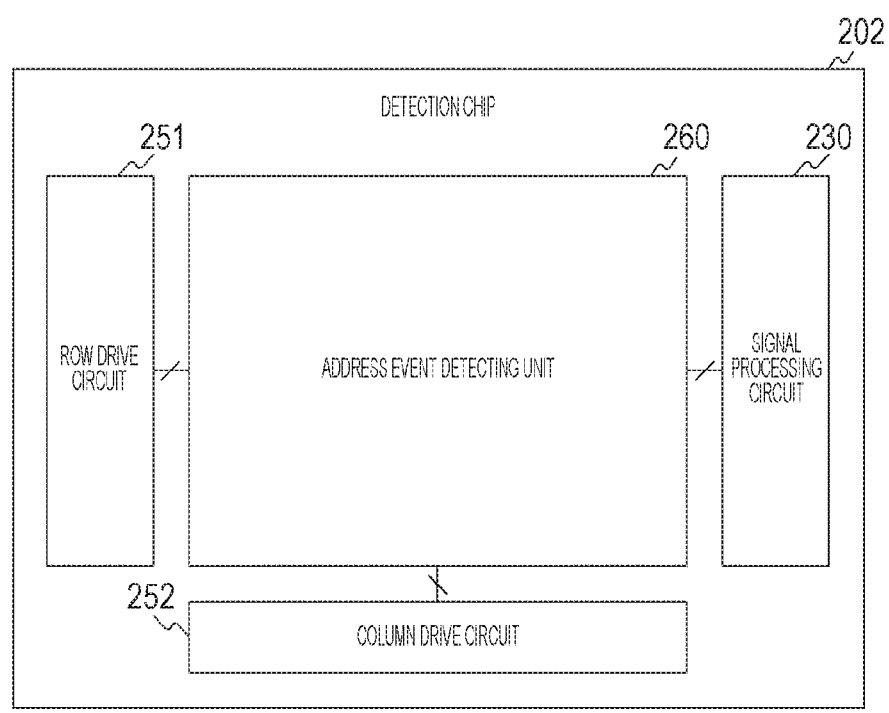
FIG. 13 is an exemplary plan view of a detection chip in a third embodiment of the present technology.

FIG. 13 is an exemplary plan view of a detection chip 202 in the third embodiment of the present technology. The detection chip 202 of the third embodiment differs from that of the second embodiment in that the address holding unit 253 is not arranged.

Figure 14:
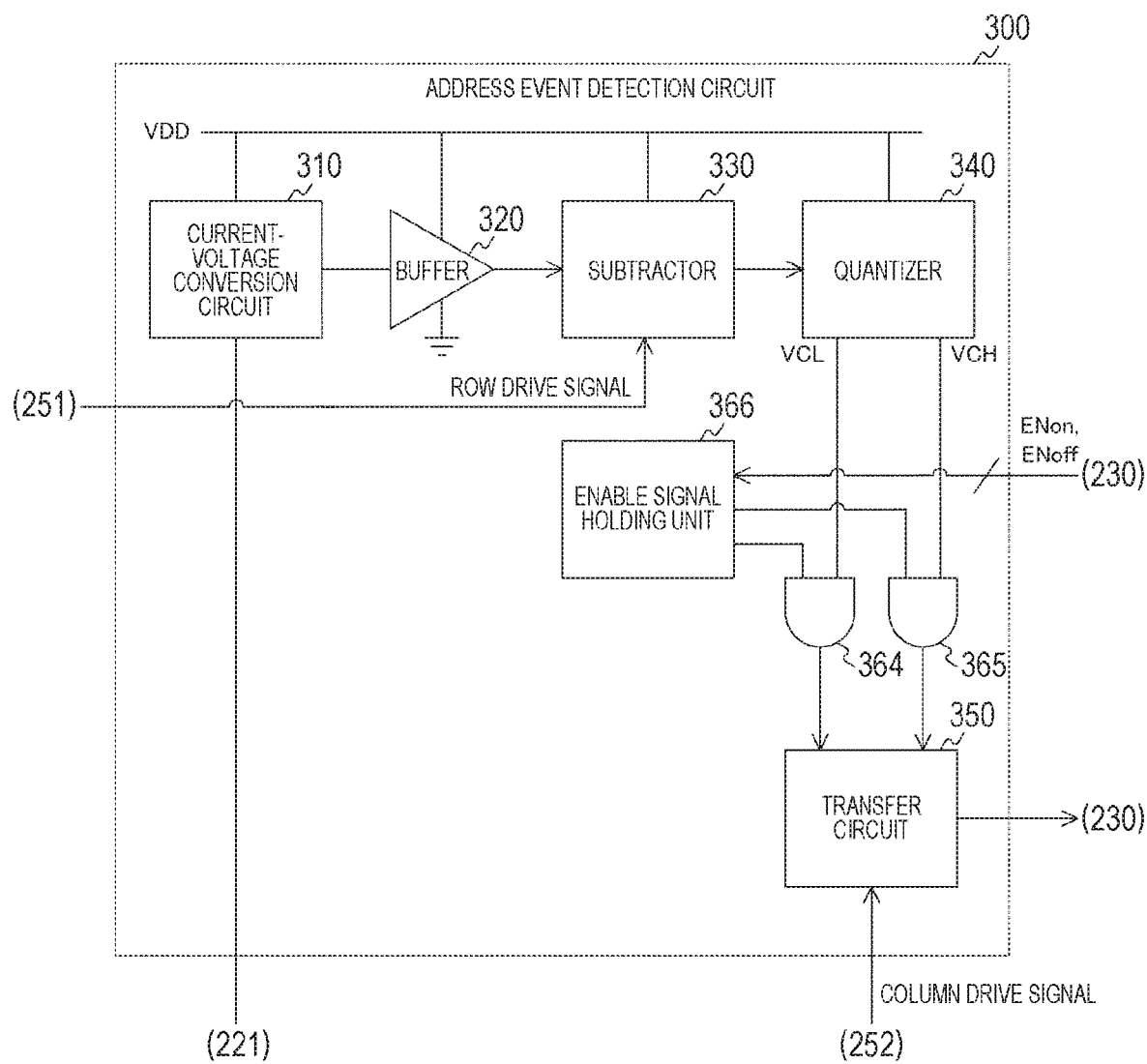
FIG. 14 is a block diagram illustrating an exemplary configuration of an address event detection circuit in the third embodiment of the present technology.

FIG. 14 is a block diagram illustrating an exemplary configuration of an address event detection circuit 300 in the third embodiment of the present technology. The address event detection circuit 300 of the third embodiment differs from that of the second embodiment in further including an enable signal holding unit 366.

The enable signal holding unit 366 holds enable signals ENon and ENoff from the signal processing circuit 230. The enable signal holding unit 366 is implemented by, for example, a latch circuit, a flip-flop or the like. The enable signal holding unit 366 supplies a holding value to each of AND gates 364 and 365.

Note that, in the third embodiment, the solid-state imaging element 200 can also cut off a power source by an enable signal in a manner similar to the first embodiment. In this case, N-type transistors 361 and 362 are arranged instead of the AND gates 364 and 365.

Thus, according to the third embodiment of the present technology, since the address event detection circuit 300 holds an enable signal of a corresponding pixel, transmission delay of the enable signal can be more suppressed than in a case of transmitting an enable signal from the signal processing circuit 230.

<Exemplary Application to Moving Object>

The technology according to the present disclosure (present technology) can be applied to various products. For example, the technology according to the present disclosure may be implemented as a device mounted on any kind of moving objects such as a car, an electric car, a hybrid electric car, a motorcycle, a bicycle, a personal mobility, an airplane, a drone, a ship, a robot, and the like.

Figure 15:
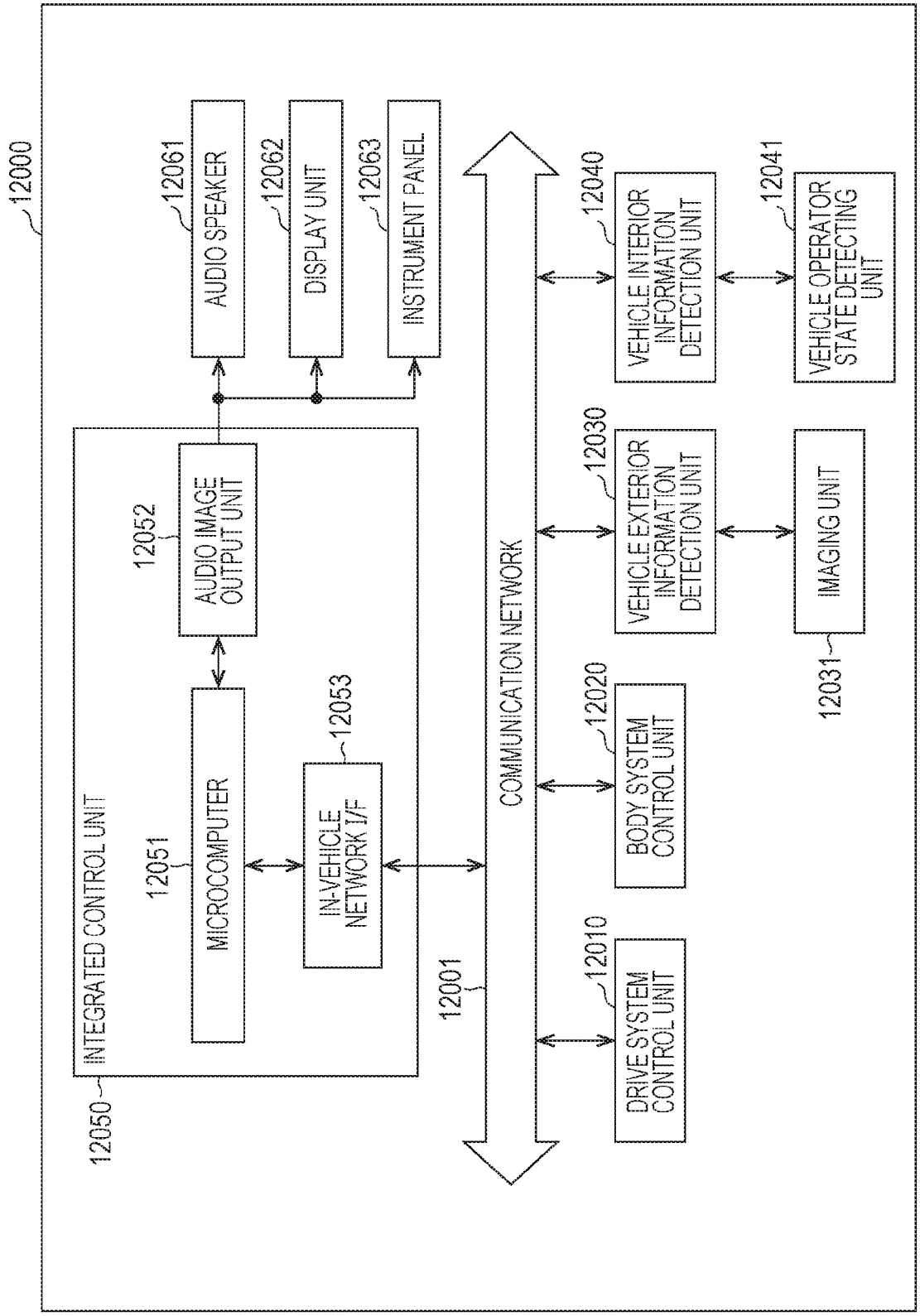
FIG. 15 is a block diagram illustrating an exemplary schematic configuration of a vehicle control system.

FIG. 15 is a block diagram illustrating an exemplary schematic configuration of a vehicle control system that is an exemplary moving object control system to which the technology according to the present disclosure can be applied.

The vehicle control system 12000 includes a plurality of electronic control units connected via a communication network 12001. In the example illustrated in FIG. 15, the vehicle control system 12000 includes a drive system control unit 12010, a body system control unit 12020, a vehicle exterior information detection unit 12030, a vehicle interior information detection unit 12040, and an integrated control unit 12050.

Furthermore, a microcomputer 12051, an audio image output unit 12052, and an in-vehicle network interface (I/F) 12053 are illustrated as functional configurations of the integrated control unit 12050.

The drive system control unit 12010 controls operation of devices associated with a drive system of a vehicle in accordance with various kinds of programs. For example, the drive system control unit 12010 functions as a control device for: a drive force generation device to generate drive force of a vehicle, such as an internal combustion engine, a drive motor, or the like; a drive force transmission mechanism to transmit drive force to wheels; a steering mechanism that adjusts a steering angle of the vehicle; a brake device that generates brake force of the vehicle; and the like.

The body system control unit 12020 controls operation of various kinds of devices equipped on a vehicle body in accordance with various kinds of programs. For example, the body system control unit 12020 functions as a control device for: a keyless entry system, a smart key system; a power window device; or various kinds of lamps such as a headlamp, a back lamp, a brake lamp, a turn indicator, a fog lamp, or the like. In this case, radio waves transmitted from a portable machine substituted for a key, or signals of various kinds of switches can be received in the body system control unit 12020. The body system control unit 12020 accepts these radio waves or signals and controls a door lock device, a power window device, a lamp, and the like of the vehicle.

The vehicle exterior information detection unit 12030 detects information associated with the outside of the vehicle having the vehicle control system 12000 mounted thereon. For example, the vehicle exterior information detection unit 12030 has an imaging unit 12031 connected thereto. The vehicle exterior information detection unit 12030 causes the imaging unit 12031 to capture an image of the outside of the vehicle, and receives the captured image. The vehicle exterior information detection unit 12030 may perform object detection processing or distance detection processing relative to a person, a vehicle, an obstacle, a sign, characters on a road surface, or the like, on the basis of the received image.

The imaging unit 12031 is an optical sensor that receives light and outputs an electric signal in accordance with an amount of the received light. The imaging unit 12031 can output an electric signal as an image and can also output an electric signal as ranging information. Furthermore, the light received by the imaging unit 12031 may be visible light or may be invisible light such as infrared light or the like.

The vehicle interior information detection unit 12040 detects information associated with the inside of the vehicle. For example, the vehicle interior information detection unit 12040 is connected to a vehicle operator state detecting unit 12041 that detects a state of a vehicle operator. The vehicle operator state detecting unit 12041 includes, for example, a camera that captures images of the vehicle operator, and the vehicle interior information detection unit 12040 may evaluate a degree of fatigue or a degree of concentration of the vehicle operator on the basis of the detection information received from the vehicle operator state detecting unit 12041, or may discriminate whether or not the vehicle operator is dozing off.

The microcomputer 12051 calculates a control target value for the drive force generation device, the steering mechanism, or the brake device on the basis of information associated with the inside or the outside of the vehicle acquired by the vehicle exterior information detection unit 12030 or the vehicle interior information detection unit 12040, and can output a control command to the drive system control unit 12010. For example, the microcomputer 12051 can perform cooperative control intended to implement functions of an advanced driver assistance system (ADAS) including: collision avoidance or impact mitigation of a vehicle; adaptive cruise based on an inter-vehicle distance; speed maintaining cruise; vehicle collision warning; vehicle lane departure warning; and the like.

Furthermore, the microcomputer 12051 controls the drive force generation device, the steering mechanism, the brake device, or the like on the basis of information associated with a periphery of the vehicle acquired by the vehicle exterior information detection unit 12030 or the vehicle interior information detection unit 12040, thereby achieving cooperative control intended to perform automated cruise and the like in which autonomous travel is performed without depending on operation by a vehicle operator.

Furthermore, the microcomputer 12051 can output a control command to the body system control unit 12020 on the basis of the vehicle exterior information acquired in the vehicle exterior information detection unit 12030. For example, the microcomputer 12051 controls a headlamp in accordance with a position of a preceding vehicle or an oncoming vehicle sensed by the vehicle exterior information detection unit 12030, and can perform cooperative control intended to perform an anti-dazzling such as switching a high beam to a low beam, and the like.

The audio image output unit 12052 transmits an output signal of at least one of audio or an image to an output device that can provide a notification of visual or audible information to a vehicle occupant or to the vehicle exterior. In the example of FIG. 15, an audio speaker 12061, a display unit 12062, and an instrument panel 12063 are exemplified as the output devices. The display unit 12062 may include at least one of an on-board display or a head-up display, for example.

Figure 16:
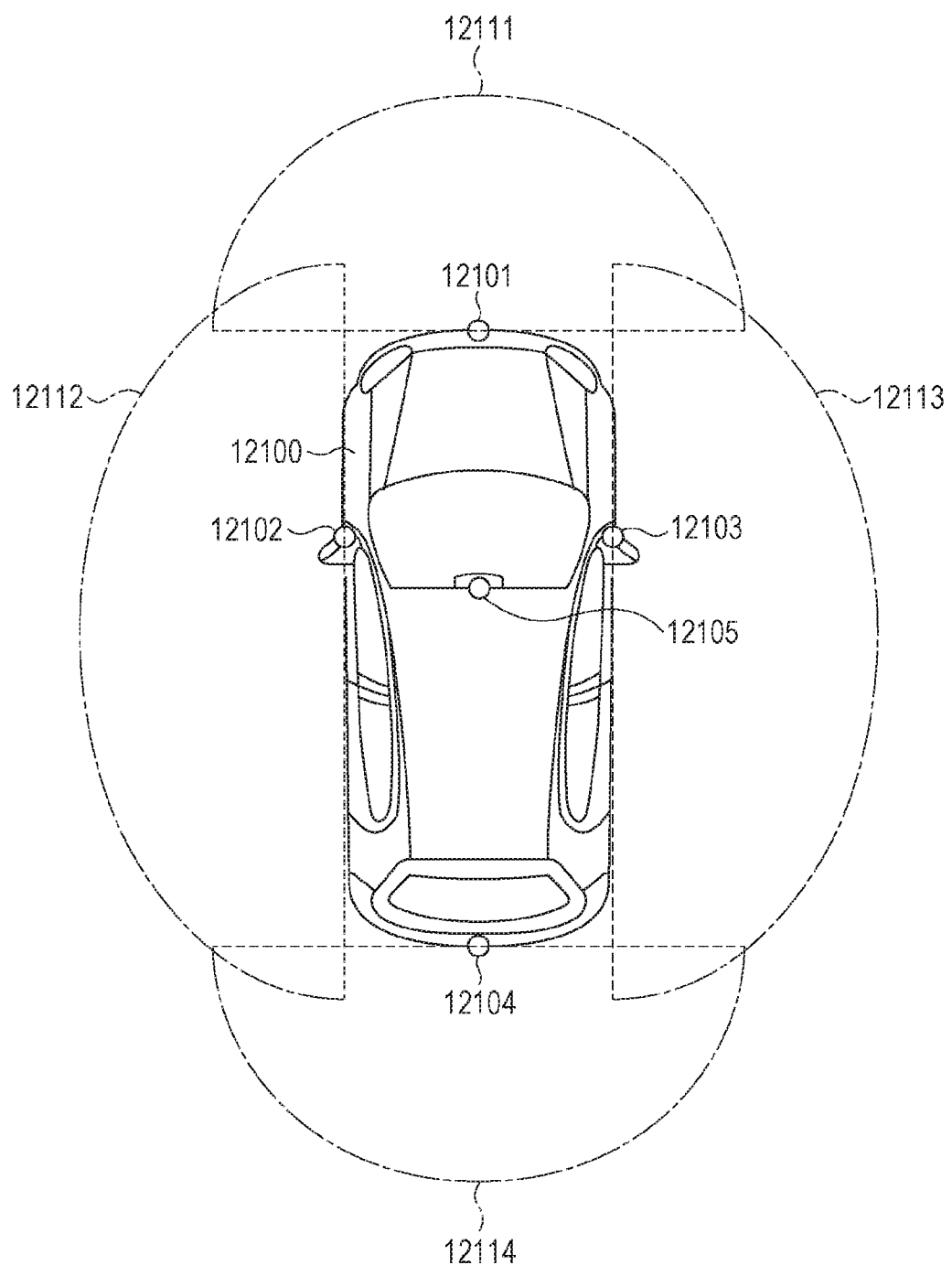
FIG. 16 is an explanatory diagram illustrating exemplary installation positions of imaging units.

FIG. 16 is a diagram illustrating exemplary installation positions of the imaging units 12031.

In FIG. 16, imaging units 12101, 12102, 12103, 12104, and 12105 are included as the imaging units 12031.

For example, the imaging units 12101, 12102, 12103, 12104, and 12105 are provided at positions such as a front nose, a side mirror, a rear bumper, a back door, an upper portion of a front windshield inside a vehicle interior of a vehicle 12100, and the like. The imaging unit 12101 provided at the front nose and the imaging unit 12105 provided at an upper portion of the front windshield inside the vehicle interior mainly acquire images in front of the vehicle 12100. The imaging units 12102 and 12103 provided at the side mirrors mainly acquire images of lateral sides of the vehicle 12100. The imaging unit 12104 provided at the rear bumper or the back door mainly acquire an image behind the vehicle 12100. The imaging unit 12105 provided at the upper portion of the front windshield in the vehicle interior is mainly used to detect a preceding vehicle, a pedestrian, an obstacle, a traffic signal, a traffic sign, a lane, and the like.

Note that FIG. 16 illustrates exemplary imaging ranges of the imaging units 12101 to 12104. An imaging range 12111 indicates an imaging range of the imaging unit 12101 provided at the front nose, imaging ranges 12112 and 12113 indicate imaging ranges of the imaging units 12102 and 12103 provided at the respective side mirrors, and an imaging range 12114 indicates an imaging range of the imaging unit 12104 provided at the rear bumper or the back door. For example, an overhead view image of the vehicle 12100 viewed from above can be obtained by overlapping pieces of image data captured by the imaging units 12101 to 12104.

At least one of the imaging units 12101 to 12104 may have a function of acquiring distance information. For example, at least one of the imaging units 12101 to 12104 may be a stereo camera including a plurality of imaging elements, or may be an imaging element including pixels for detecting a phase difference.

For example, the microcomputer 12051 obtains, on the basis of distance information acquired from the imaging units 12101 to 12104: a distance to each of three-dimensional objects within the imaging ranges 12111 to 12114; and a temporal change of the distance (a relative speed with respect to the vehicle 12100), and as a result, it is possible to extract, as a preceding vehicle, a closest three-dimensional object which exists particularly on a traveling route of the vehicle 12100 and travels at a predetermined speed (e.g., 0 km/h or more) in a direction substantially same as the vehicle 12100. Moreover, the microcomputer 12051 can preliminarily set an inter-vehicle distance to be secured in a front space with a preceding vehicle, and can perform automatic brake control (also including adaptive cruise stop control), automatic acceleration control (also including adaptive cruise start control), and the like. Thus, it is possible to perform cooperative control intended to perform the automated cruise and the like in which autonomous travel is performed without depending on operation of a vehicle operator.

For example, the microcomputer 12051 extracts three-dimensional object data associated with a three-dimensional object while categorizing the three-dimensional object into a two-wheeled vehicle, a regular vehicle, a large vehicle, a pedestrian, or another three-dimensional object such as a telephone pole or the like on the basis of the distance information obtained from the imaging units 12101 to 12104, and can use the extracted data to automatically avoid obstacles. For example, the microcomputer 12051 distinguishes whether an obstacle in the periphery of the vehicle 12100 is an obstacle visible to a vehicle driver of the vehicle 12100 or an obstacle hardly visible to the vehicle driver. Then, the microcomputer 12051 makes a determination on a collision risk indicating a risk level of collision with each obstacle, and when the collision risk is a setting value or more and there is a possibility of collision, the microcomputer 12051 can provide operational assistance in order to avoid the collision by outputting an alarm to the vehicle driver via the audio speaker 12061 and the display unit 12062 or by performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian is included in the captured images of the imaging units 12101 to 12104. Such pedestrian recognition is performed by, for example: a procedure of extracting feature points in the captured images of the imaging units 12101 to 12104 provided as the infrared cameras; and a procedure of discriminating whether or not an object is a pedestrian by applying pattern matching processing to a series of feature points indicating an outline of the object. When the microcomputer 12051 determines that a pedestrian is included in the captured images of the imaging units 12101 to 12104 and recognizes the pedestrian, the audio image output unit 12052 controls the display unit 12062 such that the display unit 12062 displays, for emphasis, a rectangular contour line over the recognized pedestrian in a superimposed manner. Furthermore, the audio image output unit 12052 may also control the display unit 12062 such that the display unit 12062 displays an icon or the like indicating the pedestrian at a desired position.

The exemplary vehicle control system to which the technology according to the present disclosure can be applied has been described above. The technology according to the present disclosure can be applied to the imaging unit 12031 among the configurations described above. Specifically, the imaging device 100 in FIG. 1 can be applied to the imaging unit 12031. By applying the technology according to the present disclosure to the imaging unit 12031, a defective pixel can be easily identified, and therefore, it is possible to improve reliability of the vehicle control system.

Note that the above-described embodiments are exemplified in order to embody the present technology, and the matters recited in the embodiments and matters specifying the invention in the claims have corresponding relations, respectively. Similarly, the matters specifying the invention in the claims and the matters denoted by the same names in the embodiments of the present technology have corresponding relations, respectively. However, note that the present technology is not limited to the embodiments and can be embodied by making various modifications to the embodiments without departing from the gist thereof.

Furthermore, the processing procedures described in the above embodiments may be regarded as a method having a series of procedures, and also may be regarded as a program to cause a computer to execute the series of procedures or as a recording medium to store the program. As the recording medium, for example, a compact disc (CD), a mini disc (MD), a digital versatile disc (DVD), a memory card, a Blu-ray disc (Blu-ray (registered trademark) Disc), or the like can be used.

Note that the effects described in the present specification are merely the examples and not limited thereto, and furthermore, additional effects may also be provided.

Note that the present technology can also adopt the following configurations.

(1) A solid-state imaging element including:

an address event detecting unit that detects, as an address event, a fact that an absolute value of a change amount of luminance exceeds a predetermined threshold value with regard to each of a plurality of pixels, and outputs a detection signal indicating a result of the detection;

a detection frequency acquisition unit that acquires a detection frequency of the address event with regard to each of the plurality of pixels; and a defective pixel identification unit that identifies, on the basis of a statistic of the detection frequency, a defective pixel where an abnormality has occurred among the plurality of pixels.

(2) The solid-state imaging element recited in (1) above, further including an invalidation setting unit that invalidly sets output of the detection signal corresponding to the defective pixel.

(3) The solid-state imaging element recited in (2) above, in which the address event detecting unit includes an address event detection circuit for each of the plurality of pixels, the address event detection circuit includes:

a current-voltage conversion circuit that converts, into a voltage signal, photocurrent generated by photoelectric conversion;

a subtractor that outputs, as a differential signal, a change amount of the voltage signal by subtraction; and a quantizer that generates a signal indicating a comparison result between the differential signal and the threshold value, and outputs the signal as the detection signal.

(4) The solid-state imaging element recited in (3) above, in which the address event detection circuit further includes a transistor that cuts off a power source of the current-voltage conversion circuit, the subtractor, and the quantizer in accordance with a setting of the invalidation setting unit.

(5) The solid-state imaging element recited in (3) above, in which the address event includes an ON event and an OFF event, the detection signal includes a detection signal of the OFF event and a detection signal of the ON event, the address event detection circuit includes:

a first logic gate that cuts off the detection signal of the ON event from the quantizer in accordance with the enable signal; and a second logic gate that cuts off the detection signal of the OFF event from the quantizer in accordance with the enable signal.

(6) The solid-state imaging element recited in any one of (3) to (5), further including an address holding unit that holds an address of the defective pixel, in which the setting unit reads the address from the address holding unit and invalidly sets output of the detection signal corresponding to the address.

(7) The solid-state imaging element recited in any one of (3) to (5) above, in which the address event detection circuit further includes an enable signal holding unit that holds an enable signal indicating whether or not to validate output of the detection signal corresponding to the address event detection circuit, and the setting unit invalidly sets output of the detection signal by the enable signal.

(8) The solid-state imaging element recited in any one of (1) to (7) above, in which the statistic includes an average value, and the defective pixel identification unit identifies, as the defective pixel, a pixel having the detection frequency deviated from the average value.

(9) An imaging device including:

an address event detecting unit that detects, as an address event, a fact that an absolute value of a change amount of luminance exceeds a predetermined threshold value with regard to each of a plurality of pixels, and outputs a detection signal indicating a result of the detection;

a detection frequency acquisition unit that acquires a detection frequency of the address event with regard to each of the plurality of pixels;

a defective pixel identification unit that identifies, on the basis of a statistic of the detection frequency, a defective pixel where an abnormality has occurred among the plurality of pixels; and an image processing unit that processes image data including the detection signal.

(10) A control method for a solid-state imaging element, including:

an address event detection procedure of detecting, as an address event, a fact that an absolute value of a change amount of luminance exceeds a predetermined threshold value with regard to each of a plurality of pixels, and outputting a detection signal indicating a result of the detection;

a detection frequency acquisition procedure of acquiring a detection frequency of the address event with regard to each of the plurality of pixels; and a defective pixel identification procedure of identifying, on the basis of a statistic of the detection frequency, a defective pixel where an abnormality has occurred among the plurality of pixels.

REFERENCE SIGNS LIST

100 Imaging device
110 Imaging lens
120 Recording unit
130 Control unit
200 Solid-state imaging element
201 Light-receiving chip 202 Detection chip
220 Light-receiving portion
221 Photodiode
230 Signal processing circuit
231 Image processing unit
232 Address event history recording unit
233 Detection frequency acquisition unit
234 Statistic acquisition unit
235 Defective pixel identification unit
236 Enable setting unit
251 Row drive circuit
252 Column drive circuit
253 Address holding unit
260 Address event detecting unit
300 Address event detection circuit
310 Current-voltage conversion circuit
311, 313, 335, 343, 344, 361, 362 N-type transistor
312, 321, 322, 333, 334, 341, 342 P-type transistor
320 Buffer
330 Subtractor
331, 332 Capacitor
340 Quantizer
350 Transfer circuit
364, 365 Logical product (AND) gate
366 Enable signal holding unit
12031 Imaging unit

The invention claimed is:

1. A solid-state imaging element comprising:
an address event detecting unit configured to detect, as an address event, a fact that an absolute value of a change amount of luminance exceeds a predetermined threshold value with regard to each of a plurality of pixels, and output a detection signal indicating a result of the detection;
a detection frequency acquisition unit configured to acquire a detection frequency of the address event with regard to each of the plurality of pixels; and
a defective pixel identification unit configured to identify, on a basis of a statistic of the detection frequency, a defective pixel where an abnormality has occurred among the plurality of pixels.

2. The solid-state imaging element according to claim 1, further comprising
an invalidation setting unit that sets output of the detection signal corresponding to the defective pixel as invalid.

3. The solid-state imaging element according to claim 2, wherein
the address event detecting unit includes an address event detection circuit for each of the plurality of pixels,
the address event detection circuit includes:
a current-voltage conversion circuit configured to convert, into a voltage signal, photocurrent generated by photoelectric conversion;
a subtractor configured to output, as a differential signal, a change amount of the voltage signal by subtraction; and
a quantizer configured to generate a signal indicating a comparison result between the differential signal and the threshold value, and output the signal as the detection signal.

4. The solid-state imaging element according to claim 3, wherein the address event detection circuit further includes
a transistor configured to cut off a power source of the current-voltage conversion circuit, the subtractor, and the quantizer in accordance with a setting of the invalidation setting unit.

5. The solid-state imaging element according to claim 3, wherein
the address event includes an ON event and an OFF event,
the detection signal includes a detection signal of the OFF event and a detection signal of the ON event,
the address event detection circuit includes:
a first logic gate configured to cut off the detection signal of the ON event from the quantizer in accordance with the enable signal; and
a second logic gate configured to cut off the detection signal of the OFF event from the quantizer in accordance with the enable signal.

6. The solid-state imaging element according to claim 3, further comprising
an address holding unit configured to hold an address of the defective pixel,
wherein the invalidation setting unit reads the address from the address holding unit and sets output of the detection signal corresponding to the address as invalid.

7. The solid-state imaging element according to claim 3, wherein the address event detection circuit further includes
an enable signal holding unit configured to hold an enable signal indicating whether or not to validate output of the detection signal corresponding to the address event detection circuit, and
the invalidation setting unit sets output of the detection signal by the enable signal as invalid.

8. The solid-state imaging element according to claim 1, wherein
the statistic includes an average value, and
the defective pixel identification unit identifies, as the defective pixel, a pixel having the detection frequency deviated from the average value.

9. An imaging device comprising:
the solid-state imaging element according to claim 1; and
an image processing unit configured to process image data including the detection signal.

10. A control method for a solid-state imaging element, comprising:
detecting, as an address event, a fact that an absolute value of a change amount of luminance exceeds a predetermined threshold value with regard to each of a plurality of pixels, and outputting a detection signal indicating a result of the detection;
acquiring a detection frequency of the address event with regard to each of the plurality of pixels; and
identifying, on a basis of a statistic of the detection frequency, a defective pixel where an abnormality has occurred among the plurality of pixels.

11. A solid-state imaging device comprising:
a memory storing program code, and
a processor configured to execute the program code to perform operations comprising:
detecting, as an address event, a fact that an absolute value of a change amount of luminance exceeds a predetermined threshold value with regard to each of a plurality of pixels, and output a detection signal indicating a result of the detection;
acquiring a detection frequency of the address event with regard to each of the plurality of pixels; and
identifying, on a basis of a statistic of the detection frequency, a defective pixel where an abnormality has occurred among the plurality of pixels.

12. The solid-state imaging device according to claim 11, wherein the operations further comprise:

setting output of the detection signal corresponding to the defective pixel as invalid.

13. The solid-state imaging device according to claim 12, wherein the operations further comprise:
holding an address of the defective pixel,
wherein setting the output comprises reading the held address and setting output of the detection signal corresponding to the address as invalid.

14. The solid-state imaging device according to claim 13, wherein the operations further comprise
holding an enable signal indicating whether or not to validate output of the detection signal; and
setting output of the detection signal by the enable signal as invalid.

15. The solid-state imaging device according to claim 11, wherein
the statistic includes an average value, and
identifying, as the defective pixel, a pixel having the detection frequency deviated from the average value.

* * * * *